United States Patent
Pearce, III et al.

(10) Patent No.: US 8,961,820 B2
(45) Date of Patent: *Feb. 24, 2015

(54) ABSORBENT POLYMER COMPOSITION WITH HAZARD INDICATOR

(71) Applicant: NCH Corporation, Irving, TX (US)

(72) Inventors: Robert C. Pearce, III, Arlington, TX (US); Katrell Deon Copeland, McKinney, TX (US); Alisha D. Farrington, Bedford, TX (US); Ecaterina Henderson, Dallas, TX (US)

(73) Assignee: NCH Corporation, Irving, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/018,744

(22) Filed: Sep. 5, 2013

(65) Prior Publication Data

US 2014/0005030 A1   Jan. 2, 2014

Related U.S. Application Data

(63) Continuation of application No. 13/074,099, filed on Mar. 29, 2011, now Pat. No. 8,551,356.

(60) Provisional application No. 61/324,089, filed on Apr. 14, 2010.

(51) Int. Cl.
| | | |
|---|---|---|
| *C01B 31/16* | (2006.01) | |
| *C09K 3/00* | (2006.01) | |
| *B01J 20/00* | (2006.01) | |
| *A01K 3/00* | (2006.01) | |
| *B01J 20/22* | (2006.01) | |
| *B01J 20/10* | (2006.01) | |
| *C09K 3/32* | (2006.01) | |

(52) U.S. Cl.
CPC ............... *B01J 20/22* (2013.01); *B01J 20/106* (2013.01); *C09K 3/32* (2013.01); *B01J 2220/46* (2013.01); *B01J 2220/49* (2013.01); *B01J 2220/68* (2013.01)

USPC ........... 252/184; 252/190; 502/400; 502/407; 119/171

(58) Field of Classification Search
CPC .......... C09K 3/32; B01J 20/106; B01J 20/22; B01J 2220/46; B01J 2220/49; B01J 2220/68; A01K 1/0152; A01K 1/0154; A01K 1/0155
USPC ............ 252/184, 190; 502/400, 407; 119/171
See application file for complete search history.

(56) References Cited

U.S. PATENT DOCUMENTS

| | | | | |
|---|---|---|---|---|
| 4,105,576 | A | * | 8/1978 | Seidenberger ............... 252/190 |
| 5,267,532 | A | * | 12/1993 | Franklin et al. .............. 119/173 |
| 5,278,206 | A | | 1/1994 | Gobel et al. |
| 6,308,658 | B1 | * | 10/2001 | Steckel ........................ 119/173 |
| 6,500,947 | B1 | | 12/2002 | West et al. |
| 8,551,356 | B2 | * | 10/2013 | Pearce et al. ................. 252/184 |
| 2005/0175577 | A1 | * | 8/2005 | Jenkins et al. .............. 424/76.1 |
| 2007/0289543 | A1 | * | 12/2007 | Petska et al. ................. 119/173 |
| 2008/0199363 | A1 | | 8/2008 | Mao |

FOREIGN PATENT DOCUMENTS

| | | |
|---|---|---|
| EP | 1834654 | 9/2007 |
| WO | WO2010/003399 | 1/2010 |

OTHER PUBLICATIONS

Perlite Grace. http://www.na.grace.construction.com/vermiculite/download/perlite.pdf Sep. 3, 2003.*

* cited by examiner

*Primary Examiner* — Harold Pyon
*Assistant Examiner* — Tanisha Diggs
(74) *Attorney, Agent, or Firm* — Ross Barnes LLP; Monty L. Ross; Robin L. Barnes

(57) ABSTRACT

An granular composition for absorbing liquids, the composition comprising perlite, super-absorbent polymer, a pH-indicating dye, and a minor amount of water. According to one preferred embodiment of the invention, the subject composition comprises about 80 weight percent perlite, about 5 weight percent SAP, about 0.0125 weight percent pH indicating dye (most preferably phenolphthalein), and from about 7 to about 9 weight percent water in the final product.

2 Claims, No Drawings

ABSORBENT POLYMER COMPOSITION WITH HAZARD INDICATOR

CROSS-REFERENCE TO RELATED APPLICATION

This continuation application claims priority to U.S patent application Ser. No. 13/074,099, filed on Mar. 29, 2011, now U.S. Pat. No. 8,551,356 which claims the benefit under 35 U.S.C. 119(e) of U.S. Provisional Application No. 61/324,089, filed Apr. 14, 2010.

TECHNICAL FIELD

This invention relates to absorbent granular compositions that are useful for cleaning up liquid spills.

BACKGROUND

Compositions are needed that are cost-effective for use in cleaning up liquid spills, and more particularly, liquid spills that occur on floors in retail stores, warehouses, schools, offices, and the like. To be effective, such compositions should desirably absorb liquids rapidly, exhibit a noticeable color change in response to the pH of the spilled liquid, and are economical enough to be used in significant volumes for cleaning a wide variety of liquid spills.

The compositions of the invention are believed to perform more effectively than absorbent compositions comprising vermiculite, diatomaceous earth, clay, cotton fibers, peat moss or sawdust. They are also less expensive than absorbent compositions comprising rubber or a high percentage of super-absorbent polymer ("SAP"). Compositions comprising superabsorbent polymers are disclosed, for example, in U.S. Pat. Nos. 5,278,206 and 6,500,947.

SUMMARY

Applicants have discovered that perlite provides better oil and solvent absorbency than either vermiculite or SAP, whether used alone or in combination. The compositions of the present invention preferably comprise perlite, SAP, a pH-indicating dye, and a minor amount of water. According to one preferred embodiment of the invention, the subject composition comprises about 80 weight percent perlite, about 5 weight percent SAP, about 0.0125 weight percent pH indicating dye (most preferably phenolphthalein), and from about 7 to about 9 weight percent water in the final product.

DESCRIPTION OF PREFERRED EMBODIMENT

A preferred composition of the invention is preferably made by mixing perlite with about 15 weight percent water premixed with about 0.0125 weight percent pH indicating dye in a ribbon mixer for about 5 minutes, then adding about 5 weight percent SAP. The combined materials are desirably mixed for about another 15-20 minutes to achieve thorough dispersion, and then dried to a total moisture content ranging from about 7 to about 9 weight percent.

Perlite is preferred for use in the compositions of the invention because it is readily available in smaller particle sizes, which means greater surface area for liquid absorption because of greater surface area, and also provides more slip resistance. A preferred perlite for use in the compositions of the invention has a specific gravity of about 2.35 and a particle size ranging from about 30 to about 100 mesh.

A preferred SAP for use in the compositions of the invention is sodium polyacrylate, a white granular powder having a specific gravity ranging from about 0.62 to about 0.74 g/ml.

All preferred components of the subject invention comply with Proposition 65 in California and are not considered hazardous due to contamination with asbestos, reactive or heavy metals, organic compounds, or the like, as are sometimes encountered, for example, in other absorbent compositions such as those containing magnesium or vermiculite. Also, because the subject compositions contain perlite rather than vermiculite, clay or other darker-colored mineral absorbents, the color change of the pH indicating dye is more apparent when the compositions contact and absorb either an acidic or basic liquid spill.

When the compositions of the invention contact spilled liquids having a pH ranging from about 5.5 to about 8.5, the absorbent desirably has a pale green color. When the compositions contact a basic liquid having a higher pH, an observable color change occurs, causing the absorbent to appear purple. For pH values in the range of 10.5-11, such as for chlorine, the color may turn white. Conversely, when the compositions contact an acidic liquid having a lower pH, an observable color change occurs, to pink or red.

When undergoing comparative testing with an absorbent product comprising vermiculite, SAP, sodium bicarbonate and sodium sulfite, the compositions of the invention generally require about half as much absorbent to absorb spilled bleach or acid drain cleaner, and about one-fifth as much to absorb spilled oil.

We claim:

1. An absorbent granular composition consisting essentially of about 80 weight percent expanded perlite, about 5 weight percent superabsorbent polymer, about 0.0125 weight percent pH-indicating dye, and water; and wherein the composition is dried to a moisture content of about 7 to about 9 weight percent.

2. The composition of claim 1, wherein the dye is a mixture of phenolphthalein, acid blue 9, and acid red 2.

* * * * *